Patented Feb. 12, 1935

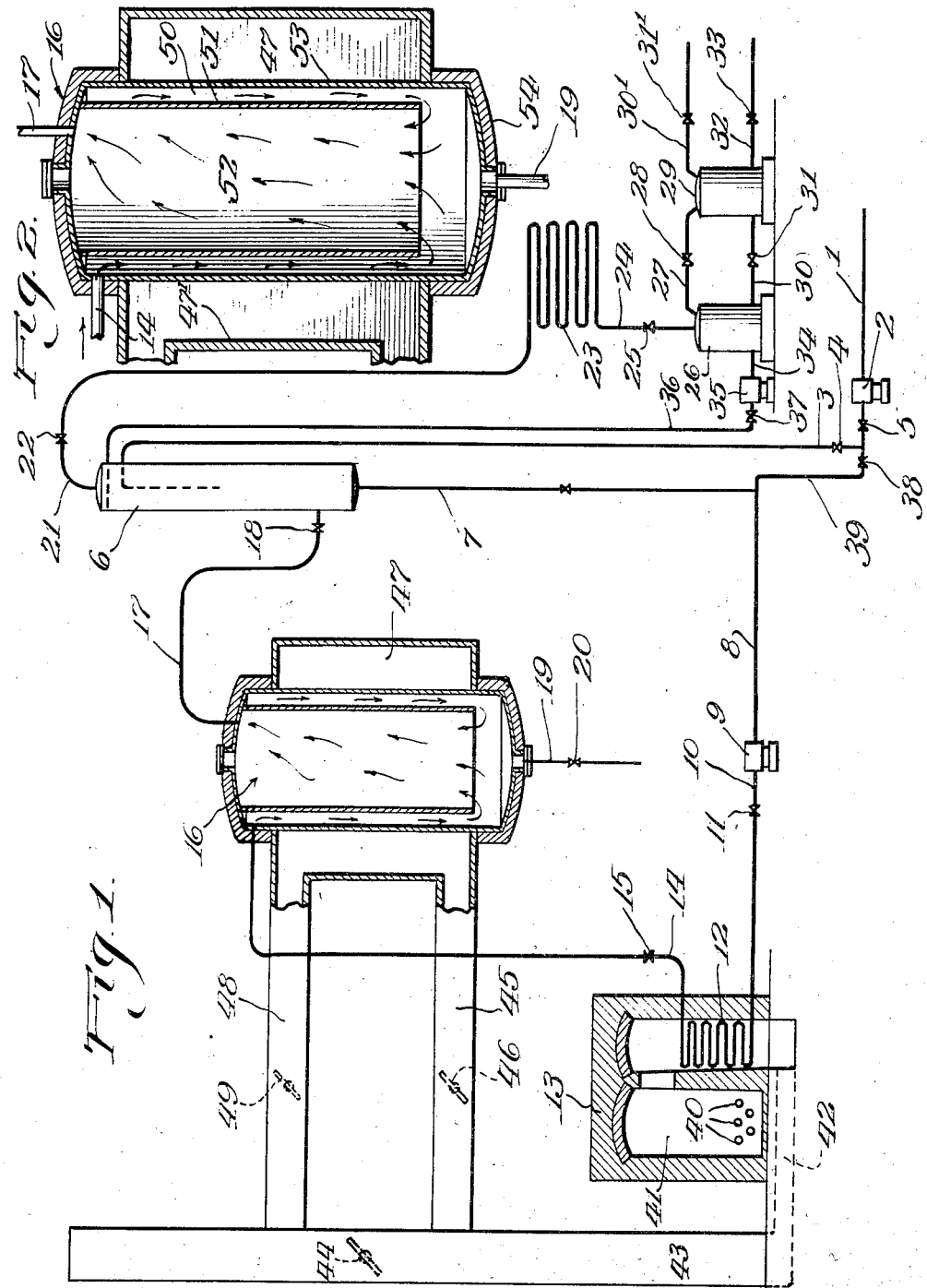

1,990,878

UNITED STATES PATENT OFFICE 1,990,878

APPARATUS FOR APPLYING HEAT TO VESSELS USED IN HYDROCARBON OIL CONVERSION

Edwin F. Nelson, Chicago, Ill., assignor to Universal Oil Products Company, Chicago, Ill., a corporation of South Dakota Application September 9, 1929, Serial No. 391,169
Renewed January 26, 1933

2 Claims. (Cl. 196—111)

This invention relates to improvements in the application of heat to vessels used in hydrocarbon oil conversion, and has for one of its principal objects, means for efficiently and uniformly heating hydrocarbon liquid passing thereinto.

In one embodiment, the invention has been designed particularly for use in the cracking of hydrocarbon oils under relatively high temperature. In a more specific embodiment, it is especially applicable to those systems of the tube and drum type using an enlarged reaction chamber wherein expansion and separation of vapors from non-vaporous products of reaction occurs. In systems of this general type the reaction chamber functions as a time zone, and according to my invention, I have designed an efficient structure for applying heat to said chamber.

One embodiment of my invention comprises a closed vessel or shell, the lateral walls of which are entirely or partially surrounded by a jacket through which a heating medium is adapted to pass. The interior of the vessel is provided with an annular wall or walls, concentrically disposed relative to the walls of the vessel, providing an annular zone or zones, which communicate with the interior of the vessel proper, or communicate successively with each other. The fluid initially admitted to the vessel is adapted to first pass through said annular zone, flowing therein in a turbulent state in proximity to the heated outer walls of the vessel, and thence into the interior proper of the vessel, from which latter non-vaporous liquid may be drawn from the lower portion thereof, while separated vapors may pass out through an outlet at the top.

Heretofore, it has been proposed, in heating a reaction or separating vessel of the character described, to provide a jacket surrounding the outer walls of the vessel through which jacket a heating medium, such as heated combustion gases or the like is circulated, but, in introducing the liquid or vapor being processed, no provision is made to uniformly heat all of the material introduced thereinto. The liquid is merely passed into the vessel and permitted to remain therein for a predetermined period in a more or less quiescent state. Obviously, with this method the film of liquid or vapor immediately adjacent the heated walls of the vessel will absorb more heat than is desirable, while the remaining liquid or vapor in the interior of the vessel will profit little by the application of the heat.

According to my invention, I propose to heat the outer walls of the vessel, but in admitting the liquid or vapors to be processed into the vessel, they are initially passed to and through said annular zone within the vessel adjacent to, and concentric with, the walls of the vessel. Due to the velocity of the material entering said annular zone, and the comparatively restricted area of the zone, the material assumes a turbulent state within the zone, which insures an efficient and uniform heat transfer from the heated walls of the vessel to the liquid or vapors. No quiescent film is permitted to remain upon said inner walls because of the violent motion of the liquid or vapors, and hence, undesirable overheating and consequent formation of objectionable amounts of coke is prevented. The liquid or vapors may then enter the interior of the vessel where separation of vapors from non-vaporous material may take place.

It will be understood that the invention in its broadest aspects contemplates the use of one or more of said concentric zones, that is, a plurality of concentric zones may be provided, one within the other, wherein the liquid or vapor flow through adjacent zones may be opposite, if desired.

In the drawing, Fig. 1 is a diagrammatic side elevational view, partly in section, showing apparatus suitable for carrying out a process for cracking hydrocarbon oils for which this invention is particularly adapted.

Fig. 2 is an enlarged detail cross-sectional view showing the arrangement of a reaction chamber comprising one embodiment of my invention.

Referring more particularly to the drawing, and in particular to Fig. 1, the charging stock to be processed may be delivered from storage through line 1 and by means of pump 2 forced through line 3, in which may be interposed valves 4 and 5 (valve 38 in branch 39 being closed). The oil from line 3 may pass into dephlegmator 6 where it assists in condensation and fractionation of the vapors entering the bottom of the dephlegmator. Reflux condensate collecting in the lower part of the dephlegmator, together with unvaporized charging stock, passes out of the bottom thereof through lines 7 and 8 to the suction side of hot oil pump 9, from which it is forced through line 10, controlled by valve 11, through heating coil 12 disposed in a conventional furnace 13. The oil from heating coil 12 leaves through transfer line 14, in which may be interposed valve 15, discharging into reaction chamber 16. The heated hydrocarbon mass entering reaction chamber 16 separates therein into vapors and non-vaporous products, the vapors passing out through vapor outlet line 17, in which may be interposed valve 18, while the non-vaporous products pass to the bottom of the chamber to be withdrawn through residue drawoff line 19, controlled by valve 20, to a cooler (not shown), or if desired, may be further processed. The vapors leaving chamber 16 through line 17 may be passed into the lower portion of dephlegmator 6, wherein sufficiently converted portions are separated from insufficiently converted portions, the latter collecting as reflux condensate to be returned for retreatment together with the raw oil, as heretofore described.

The vapors remaining uncondensed after passing through dephlegmator 6, which comprise those vapors which are sufficiently converted, pass out of the dephlegmator through vapor line 21, controlled by valve 22, into condenser 23. These vapors consist of non-condensable gases and condensable distillate, the condensable distillate being condensed in condenser 23. The mixture of condensed liquid and non-condensable gas leaves the condenser through line 24, in which may be interposed valve 25, passing to receiver 26 where a separation of the gases and distillate occurs. The pressure at which this separation occurs may be controlled by the rate at which gas passes through gas outlet line 27, controlled by valve 28, into a gas separator 29 maintained at lower pressure. The liquid level in receiver 26 may be controlled by the rate of withdrawal of distillate through distillate drawoff line 30, in which may be interposed valve 31, line 30 connecting to the bottom of the gas separator 29. Non-condensable gas from gas separator 29 may pass out through outlet line 30', controlled by valve 31', from which point it may pass to storage or to any other point of utilization.

The distillate in the gas separator 29 may be withdrawn through liquid drawoff line 32, controlled by valve 33, and may be passed to storage. Regulated portions of the distillate collecting in receiver 26 may be withdrawn through distillate recirculating line 34 leading to the suction side of distillate recirculating pump 35, from which point regulated portions of the distillate may be forced through line 36, controlled by valve 37, to the top of dephlegmator 6 to aid in the condensation and fractionation of the vapors leaving the dephlegmator.

It may sometimes be found desirable not to feed all of the charging stock to the top of dephlegmator 6, in which case valve 4 may be partially or totally closed and valve 38 partially or totally opened, permitting the passage of a part or all of the charging stock through branch 39 and line 8 to the suction side of hot oil pump 9.

The oil passing through coil 12 is heated in furnace 13, provided with burner 40, which may utilize oil, gas, coal, coke or other fuel. Combustion gases from burner 40 may pass from combustion chamber 41 through bank 12 which may be heated as found desirable either by radiation, convection or conduction. After passing through heating coil 12, the combustion gases may continue their passage through duct 42 and up through stack 43. The draft on furnace 13 may be controlled by damper 44.

Referring more particularly to Fig. 2, 53 designates a closed cylindrical vessel surrounded by a jacket 47' providing an annular space 47 through which a heating medium such as heated combustion gases or the like, may be circulated. A portion of the flue gases passing through stack 43 may be by-passed through duct 45, controlled by damper 46 into the lower portion of heating enclosure 47 which surrounds the reaction chamber. The flue gases may leave heating enclosure 47 through duct 48, controlled by damper 49, into stack 43. The relative proportions of flue gases going direct up the stack to the heating enclosure 47 may be controlled by proper manipulation of dampers 44, 46 and 49.

The interior of the vessel 16 may be provided with an annular plate 51 which is preferably spaced from, and disposed concentric with, the walls 53 of the vessel 16, for substantially the length thereof, providing an annular zone 50 which communicates with the interior of the vessel at the lower portion thereof, as illustrated. The heated hydrocarbon mass from coil 12 enters the reaction chamber 16 through line 14 where it passes through the annular compartment 50. The mass then passes down underneath the base of partition 51, the separated vapors then passing up through the central opening 52 from whence they leave through line 17.

The flue gases being at a higher temperature than the metal wall 53 of reaction chamber 16 heat said wall, which in turn imparts the heat to the oil or vapors passing through annular space 50, which, due to its relatively small cross-section, causes the oil or vapor to be sufficiently turbulent so as not to cause overheating of the film layer next to wall 53. While only one concentric partition is shown, it is to be understood that a series of these partitions may be used to force the oil or vapors up and down through reaction chamber 16 if found desirable.

To prevent heat losses from reaction chamber 16, insulation may be placed on the top and bottom of said chamber, as illustrated in cross-section at 54. It has heretofore been the practice to permit the oil and vapors entering through line 14 to pass unrestricted to either line 17 or line 19, heat being applied to the reaction chamber 16 by the use of heating enclosure 47. In utilizing my invention, the heated hydrocarbon mass may be introduced into the reaction chamber so as to obtain a maximum velocity and considerable turbulence so as to effect sufficient heat transfer from heated wall 53 to the vapors and oil passing through annular space 50. This turbulence breaks up the film next to wall 53 and thus prevents overheating of any portion of the oil and the consequent formation of coke or like undesirable substances.

I am aware that many details of construction may be varied without departing from the spirit of my invention. For example, the distance between the walls 53 and 51 may be varied but preferably this distance should be so chosen as to obtain a sufficiently restricted zone 50 to cause the desired turbulency and rapid motion to obtain an effective and uniform heat transfer.

I claim as my invention:

1. A reaction chamber for use in the cracking of oil comprising a vertical cylindrical vessel of substantially uniform cross-section from top to bottom, a cylindrical baffle depending from the top of said vessel to a point adjacent the bottom of the vessel and being concentric with and spaced from the vertical wall of said vessel thereby forming an annular passageway with said wall, the interior cross-sectional area enclosed by said baffle being substantially greater than the cross-sectional area of said passageway, means for introducing heated oil to the upper portion of said annular passageway, a residue outlet at the lower portion of said vessel, means for removing vapors from the upper interior portion enclosed by said baffle, a jacket surrounding the exterior of said wall, and means for passing a heating medium through said jacket.

2. An oil cracking apparatus comprising a heating coil, disposed within a furnace, a vertical cylindrical reaction chamber of substantially uniform cross-section from top to bottom, a cylindrical baffle depending from the top of said chamber to a point adjacent the bottom thereof and concentric with and spaced from the vertical wall of the chamber, said baffle forming with said wall an annular restricted passageway of smaller cross-section than the interior portion enclosed by said baffle, means for passing heated oil from said coil into the upper portion of said passageway, means for removing residue from the lower portion of said chamber, means for removing vapors from the upper interior portion enclosed by said baffle, a jacket surrounding the exterior of said wall, and means for passing a regulated portion of the waste combustion gases from said furnace through said jacket.

EDWIN F. NELSON.